Feb. 1, 1966 G. L. WAX 3,232,732
INSULATING CONTAINER AND METHOD OF MAKING SAME
Filed Jan. 29, 1962 2 Sheets-Sheet 1
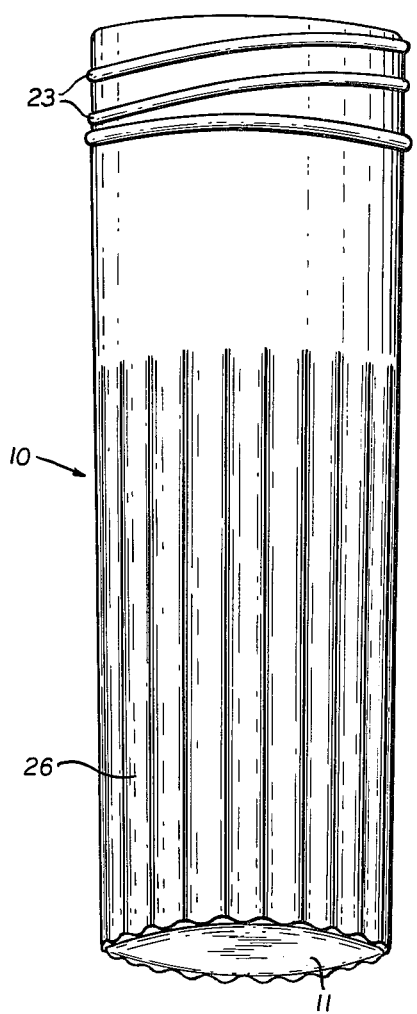
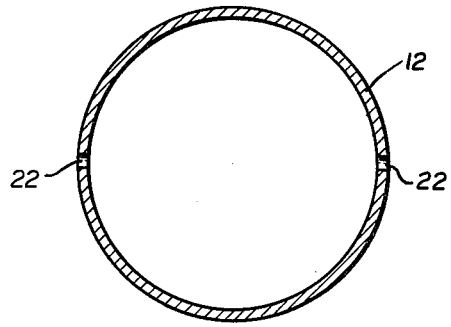
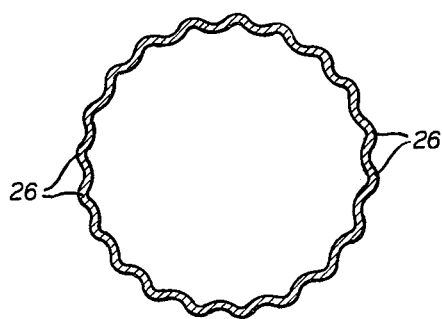
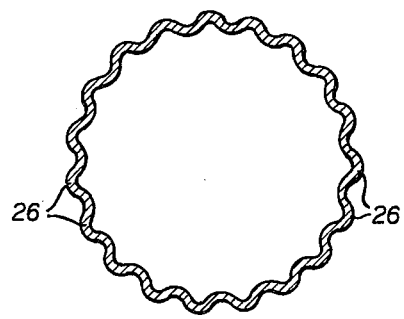
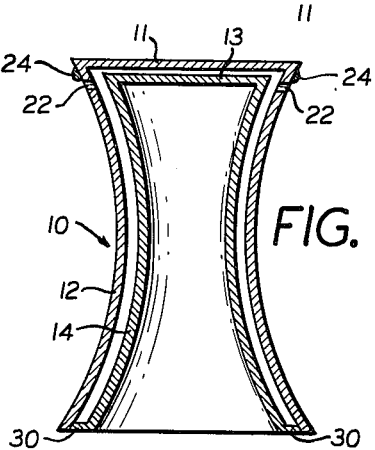
INVENTOR
GEORGE LESTER WAX
BY
Hubbell, Cohen & Stiefel
ATTORNEYS.

Feb. 1, 1966  G. L. WAX  3,232,732
INSULATING CONTAINER AND METHOD OF MAKING SAME
Filed Jan. 29, 1962   2 Sheets-Sheet 2
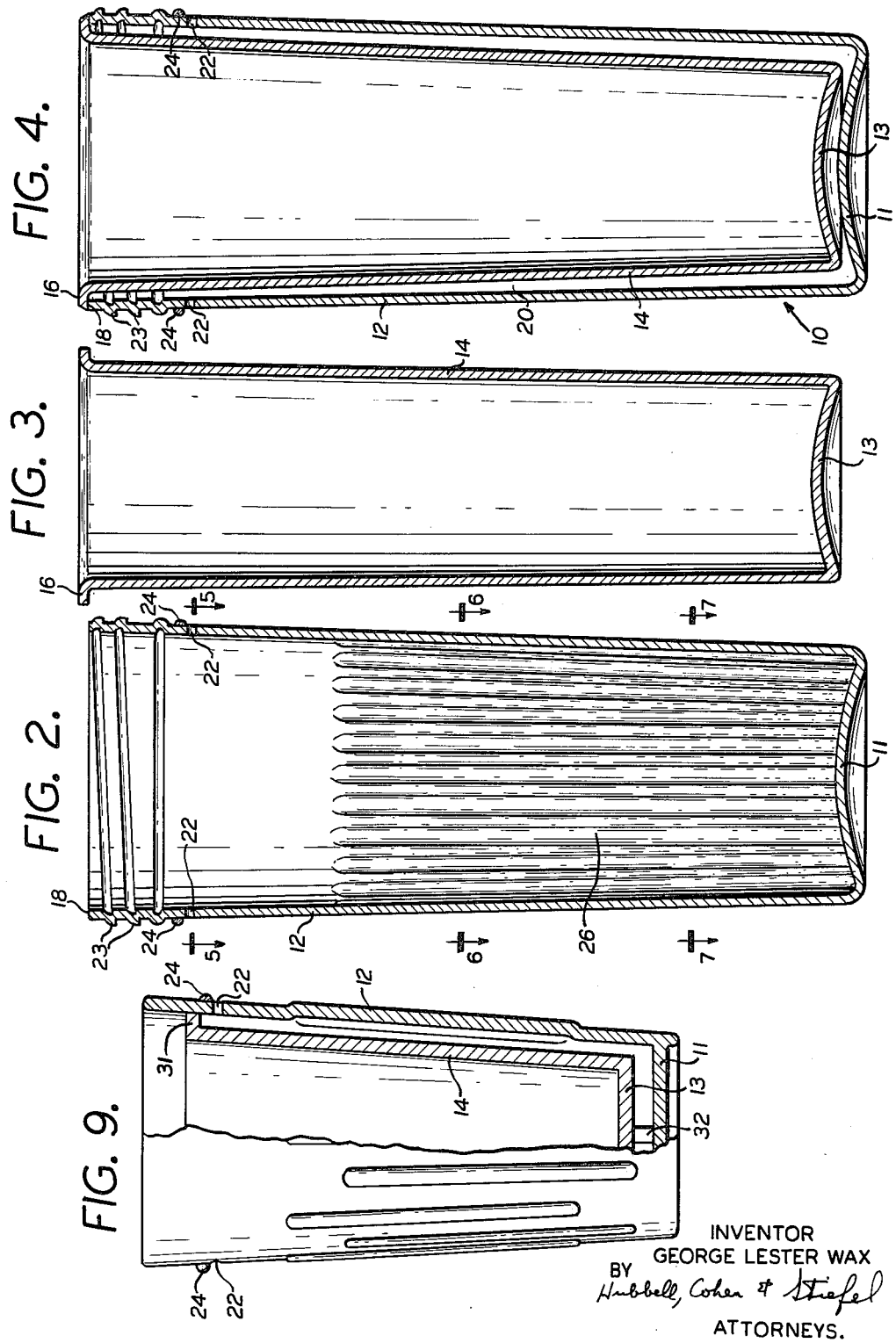
INVENTOR
GEORGE LESTER WAX
BY
Hubbell, Cohen & Stiefel
ATTORNEYS.

United States Patent Office 3,232,732
Patented Feb. 1, 1966

3,232,732
INSULATING CONTAINER AND METHOD
OF MAKING SAME
George L. Wax, 34 Florida St., Long Beach,
Long Island, N.Y.
Filed Jan. 29, 1962, Ser. No. 169,226
Claims priority, application Japan, Feb. 6, 1961,
9 Claims. (Cl. 65—34)

This invention relates to an insulated container and to a method for making the same. More particularly, this invention relates to a novel double walled container and to a method for partially evacuating the air from the space between the walls and then sealing off the such partially evacuated space so as to obtain a container having unusually good insulating properties.

Heretofore it has been known to provide double walled glass containers wherein the space between the walls has been evacuated by means of a vacuum pump. Such containers, frequently referred to as Thermos bottles, require complex fabrication techniques, are expensive to manufacture, and are relatively fragile and easily broken.

It has also been suggested to fabricate a partially evacuated double walled container without the use of a vacuum pump. In this proposed fabrication method two walls of ceramic material are provided, one wall is placed inside the other, and the walls are connected to each other at their edge portions. These ceramic walls are originaly in their raw state. A raw glazing mass is applied to the outer surface of the double walled container and the whole is then fired to a high temperature, whereupon it is suggested that part of the air in the space between the inner and outer walls is driven through both the walls and the raw glaze superimposed thereover, both the ceramic walls and the glaze purportedly being sufficiently porous to permit the passage of air therethrough. Upon reaching a high enough temperature, however, the raw glaze is said to gradulally soften and fuse, thereby liquifying and flowing over the walls of the container to effect a seal so that the space between these walls, which presumably has been partially evacuated by the heating operation, will be tightly sealed and rendered air impervious, thus providing a partially evacuated container having insulating properties. Unfortunately, this method has not proven at all satisfactory. Although the cermaic material making up the wall is somewhat porous, this porosity has not been sufficient to permit rapid passage of air therethrough. It will be seen that as the container is heated, the air in the space between the walls wants to expand. Since the volume of this space is fixed, there is a gradual bulid-up in pressure. The porosity of the walls is simply not sufficient to permit ready passage of the air therethrough, so that a considerable pressure head is invariably built up. The inevitable result is that in far too many instances the container will actually "explode" as a result of such heat-induced internal air pressure. That is, the air pressure builds up to such magnitude that the strength of the raw ceramic walls can not withstand such pressure, and the walls will then burst or crack. It is further true where the container has not first been body fired, the container is not very strong and possesses poor shape retention characteristics in the higher temperature ranges of the kiln, so that any internal air pressure may cause the walls to "bow" as well as ultimately to crack.

It is an object of the present invention to provide a novel double walled container wherein the air space between the walls has been partially evacuated.

Another object is to provide a container having improved strength and heat insulating properties.

A further object is to provide a unique yet simple method for obtaining such a partially evacuated double walled container, which method eliminates any likelihood of the container bursting during the firing thereof.

Another object is to provide a method of making a double walled container having improved insulating properties and having improved strength characteristics.

Other objects, characteristics, and advantages of my invention will be understood by reference to the following description taken in conjunction with the appended drawings wherein:

FIG. 1 shows the improved double walled container of my invention;

FIG. 2 is a sectional view along the line 2—2 of FIG. 1 and shows the outer wall of my container;

FIG. 3 is a sectional view along the line 3—3 of FIG. 1 and shows the inner wall of my container;

FIG. 4 is a sectional view taken along the line 4—4 of FIG. 1 and shows the inner wall in position within the outer wall of my container;

FIG. 5 is a sectional view taken along the line 5—5 of FIG. 2;

FIG. 6 is a sectional view taken along the line 6—6 of FIG. 2;

FIG. 7 is a sectional view taken along the line 7—7 of FIG. 2;

FIG. 8 shows another embodiment of my invention and is a sectional view of a double walled container, which container is placed in inverted position; and FIG. 9 shows another embodiment of my invention and illustrates a double walled container, the inner wall being supported at the bottom by and in spaced relationship with the outer wall.

Referring now to the drawings and particularly to FIGS. 1–4, there is provided a double walled container generally designated by the reference numeral 10. This container comprises an outer wall 12 and an inner wall 14. These walls are desirably made of a suitable ceramic material. The inner wall 14 is inserted into the outer wall 12, the bottom of the inner wall being spaced from the bottom 11 of the outer wall, whereupon the lip 16 of the inner wall rests upon the top 18 of the outer wall 12. It will be seen that the inner wall lies in spaced-apart relationship with respect to the outer wall, and this space, designated by the reference numeral 20 contains air. The outer wall 12 is provided with one or more air vents or holes 22. Desirably, these holes are near the top of the wall 12. The outer wall may also be provided near the top with external threads 23 integral therewith. Accordingly, a cap (not shown) with matching internal threads can be secured to the container to further enhance its insulating capacities.

The inner and outer walls of the container are desirably dried prior to joining them together. Such drying is usually carried out by gradually heating the container up to a temperature of about 900° C. (bisque firing), whereupon all of the moisture is driven off and the strength is sufficiently increased to insure ease of handling without risk of breakage or deformation. The bisque firing is conveniently carried out by placing the inner wall loosely within the outer wall, thereby saving on kiln space, but leaving sufficient space between the walls for air to escape. The temperature is then permitted to drop to room temperature. The holes may either be cut prior to the bisque firing or thereafter, but in any event, prior to body firing of the container.

After the bisque firing, glaze is applied to the container. The inner wall is placed within the outer wall in position for permanent bonding. The container is body fired at a temperature of from about 1200 to 1450° C. The body firing serves two functions in that it fuses the glaze to the body walls to thereby render these walls completely air-impervious, while at the same time it causes a slight softening of the ceramic material making up the walls, so that the two walls will, at their points of contact, "wet" one another and bond or unite. As shown in FIG. 4, the bonding occurs between the lip 16 of the inner wall 14 and the top 18 of the outer wall 12. The body firing further serves to promote a crystalline orientation or alignment in the body so that it is greatly strengthened and dimensionally stabilized. The thus glazed, semi-fired container is then cooled down.

A "slug" 24 of appropriate ceramic material is adhered to the outside of the outer wall 12. This slug 24 is so positioned as to be close to and desirably just above the hole 22. The slug 24 is made of a material having a softening point and/or melting point somewhat lower than the softening point of the ceramic material making up the two walls of the container. Typically the slug 24 is made of a glaze-type material. Naturally, as many slugs are provided as there are holes in the outer wall, for ultimately each such hole must be tightly sealed.

In order to partially evacuate and then seal the double walled container of my invention, the container is placed in an oven and the temperature therewithin is gradually raised, typically to from about 700 to 1250° C. As the temperature rises, the air within the space between the inner and outer wall will become heated and will want to expand. Since air holes 22 are provided in the outer wall 12, there is no impediment to such expansion and a portion of the air originally within the space 20 between the walls will be expelled through holes 22. As the temperature continues to rise, more and more air will be evacuated from space 20. Gradually however, the fusion point or flow point of the slug 24 will be reached, and at such temperature the slug will tend to seep or flow downward, actuated by gravity, and will thus seep over the hole 22, thereby effecting a sealing-off of the hole. Once slug 24 has flowed over its corresponding hole 22, the container is gradually cooled down. As the temperature drops, the remaining air within the space 20 contracts, thereby creating a partial vacuum within the space between the inner and outer wall. Accordingly, the atmosphereic pressure on the outside of the slug 24, which slug has now sealed hole 22, will press against the slug and force it further into the hole, thereby effecting a completely air-tight permanent seal. It will be seen that as the glaze is forced into the hole it will become integral with the body structure. The container is ultimately cooled down to room temperature and removed from the oven. Accordingly the space between the two walls contains only a fraction of the air that it originally contained, prior to its evacuation.

The resulting double walled container possesses unique insulating properties and offers obvious advantages in the handling of either a hot or cold liquid or solid and in the maintaining of such liquid or solid at its initial temperature.

It is important to note that by virtue of the hole or holes 22 there is no opportunity for any thermally induced pressure head to build up in the space 20 between the inner and outer walls. The possibility of any explosion or bursting of the container during the heating operation is therefore virtually eliminated.

It will be noted that desirably the outer container wall can be formed with vertical ridges 26 so that the cross-section thereof will present a wavy or undulating configuration. This is shown in FIGS. 1 and 5–7. These vertical ridges 26 impart additional strength to the container. As shown in FIGS. 1 and 5–7, the depth of the ridges becomes more pronounced as one approaches the bottom of the container. Such ridges also permit the container to be more easily grasped and held.

In accordance with another embodiment of my invention, and referring to FIG. 8, a double walled container 10 is provided, this container having an outer wall 12 and an inner wall 14, these walls being secured to one another in air-tight fashion at the top 30 thereof, thereby defining a space 20 therebetween. This container is placed in inverted position with the bottom 11 face up.

Accordingly, the placement of the hole or holes 22 in the outer wall 14 is different from the placement of the hole 22 in the container shown in FIGS. 1–4. That is, rather than cutting the hole 22 at or near the top of the container wall (as in FIGS. 1–4) the hole is cut near the bottom 11. This embodiment of my invention is advantageous in that it permits fabrication of a container having a relatively heavy inner wall. That is, when the container is inverted the weight of the inner wall essentially will be borne by the support for the container. When the container is heated so that the air within space 20 expands, the air will tend to rise upward. With hole 22 being near the bottom of the inverted container, more air will escape from space 20 than if the hole were at or near the top of the inverted container.

Obviously, if my method of partial evacuation and sealing is carried out with the container in upright position (FIG. 1–4) the hole 22 is desirably placed near the top of the container; conversely, if the container is inverted (FIG. 8), the hole is placed near the bottom 11 thereof. In either case, the hot air naturally rises to the vent or vents from which it escapes, so that a more complete evacuation is secured without the development of appreciable strain at the place of connection of the outer and inner walls.

In accordance with yet another embodiment of our invention, rather than relying solely upon sealing the inner lip 16 to the outer wall 12 at the top of the container (as shown in FIGS. 2–4) to provide a space between the walls, the inner wall 14 can also be supported in spaced relation from the outer wall 12 yet joined thereto by means of a ceramic support 32 (FIG. 9), which support is bonded to both the bottom 11 of the outer wall and the bottom 13 of the inner wall of the container. The inner wall 14 is also bonded to the outer wall 12 on a circumference 31 near the top thereof.

It will be apparent that in accordance with the method of my invention, the degree of evacuation of the space 20 between the container walls is a function of the melting point of the material from which the hole-covering slugs 24 are made. The higher this melting point, the higher the temperature to which the container can be heated before the holes are sealed, and the greater the degree of air expansion and ejection from the space 20.

The particular ceramic material from which the walls are made is not critical, the main requirement of such material being that it have a softening point or melting point higher than that of the material from which the hole-sealing slugs are made. Suitable ceramic materials include porcelain, earthenware, and the like.

It will be noted that my invention relates not only to the production of double-walled tumblers, but may also be applied to the production of casseroles, soup tureens, etc.

Although my invention has been described with reference to the sealing of a hole in the outer wall 12 of my container, it will be apparent that my method is also applicable wherein the hole is within the inner wall 14. The sealing mechanism whereby a slug 24 of flowable material, e.g. glaze, is heated until it flows over and seals such hole is, of course, the same regardless of whether the hole is in the outer or inner wall.

Variations can of course be made without departing from the spirit of my invention.

Having thus described my invention, what I desire to secure and claim by Letters Patent is:

1. A method of substantially evacuating and sealing the space between the walls of a double walled container having an aperture formed in one of the walls, the method comprising adhering a slug of material to said wall above said aperture, said slug being made of a material which had a melting point below the melting point of said walls, heating the whole of said container whereby air within said air space is heated and expands through said aperture to substantially evacuate said air space until said slug reaches its softening point, and permitting said slug to flow over said aperture and seal off said substantially evacuated air space.

2. The method of claim 1 wherein said walls are made of a ceramic material and that said slug is made of glaze.

3. The method of claim 1 wherein said aperture is in said outer wall.

4. The method of claim 1 wherein when said container is supported for said heating step said aperture is so positioned in said wall that said heated and expanded air rises to pass therethrough.

5. The method of claim 1 wherein said heating step is carried out at a temperature of from about 700 to 1250° C.

6. The method of claim 1 wherein after said slug has flowed over said aperture, the temperature is lowered whereby the ambient air pressure causes said slug to be firmly pressed into said aperture.

7. The method of claim 1 wherein the outer wall of said container is provided with a plurality of strength-imparting vertical ridges.

8. The product of the method of claim 1.

9. A method of substantially evacuating and sealing the space between the walls of a double walled container made up of an inner base wall, an outer base wall spaced therefrom, an inner side wall connected to the periphery of said inner base wall, an outer side wall connected to the periphery of said outer base wall and spaced from said inner side wall, said inner side wall being connected to said outer side wall in a region remote from said base walls to thereby define a space between said walls, one of said walls having an aperture formed therein, this method comprising adhering a slug of material to said wall above said aperture, said slug being made of a material which has a melting point below the melting point of said walls, heating the whole of said container whereby air within said space is heated and expands through said aperture to substantially evacuate said space, continuing said heating until said slug reaches its softening point, and permitting said slug to flow over said aperture and seal off said substantially evacuated space.

References Cited by the Examiner
UNITED STATES PATENTS 2,736,143 2/1956 Ford _____ 65—34 X
2,988,852 6/1961 Henry _____ 65—34

DONALL H. SYLVESTER, *Primary Examiner.*